United States Patent [19]

Barclay

[11] 4,408,463

[45] Oct. 11, 1983

[54] WHEEL-TYPE MAGNETIC REFRIGERATOR

[75] Inventor: John A. Barclay, Los Alamos, N. Mex.

[73] Assignee: The United States of America as represented by the U.S. Department of Energy, Washington, D.C.

[21] Appl. No.: 340,904

[22] Filed: Jan. 20, 1982

[51] Int. Cl.³ .................................................. F25B 21/02
[52] U.S. Cl. .................................................................. 62/3
[58] Field of Search ................................................. 62/3

[56] References Cited

U.S. PATENT DOCUMENTS

| | | | |
|---|---|---|---|
| 3,743,866 | 7/1973 | Pirc | 62/3 X |
| 4,033,734 | 7/1977 | Stegert, Jr. et al. | 62/3 |
| 4,107,935 | 8/1978 | Stegert, Jr. | 62/3 |
| 4,332,135 | 6/1982 | Barclay et al. | 62/3 |

Primary Examiner—Lloyd L. King
Attorney, Agent, or Firm—Robert W. Weig; Paul D. Gaetjens; Richard G. Besha

[57] ABSTRACT

The disclosure is directed to a wheel-type magnetic refrigerator capable of cooling over a large temperature range. Ferromagnetic or paramagnetic porous materials are layered circumferentially according to their Curie temperature. The innermost layer has the lowest Curie temperature and the outermost layer has the highest Curie temperature. The wheel is rotated through a magnetic field perpendicular to the axis of the wheel and parallel to its direction of rotation. A fluid is pumped through portions of the layers using inner and outer manifolds to achieve refrigeration of a thermal load.

19 Claims, 7 Drawing Figures

DETAILED MAGNETIC REGENERATIVE WHEEL

ENTROPY-TEMPERATURE DIAGRAMS FOR
MAGNETIC MATERIAL AT DIFFERENT DIAMETERS

Fig. 1

OUTER MATERIAL OPERATING NEAR $T_H$

Fig. 2

INTERMEDIATE MATERIAL OPERATING NEAR $T'$

Fig. 3

INNER MATERIAL OPERATING NEAR $T_C$

WHEEL-TYPE MAGNETIC REFRIGERATOR

This invention is the result of a contract with the Department of Energy (Contract No. W-7405-ENG-36).

BACKGROUND OF THE INVENTION

The field of the invention relates to refrigeration and more particularly to magnetic refrigeration utilizing wheel-type apparatus. Related to the instant invention is an invention disclosed in U.S. patent application Ser. No. 228,836, filed Jan. 27, 1981, now U.S. Pat. No. 4,332,135, which is directed to reciprocating refrigeration apparatus.

The attractiveness of the use of liquid hydrogen as a portable fuel is decreased by the cost and energy inefficiency of conventional liquefaction processes. Were these factors to be substantially reduced, liquid hydrogen would very likely be the fuel of choice to replace fossil-based fuels in many applications, and especially in the near term as jet engine aircraft fuel. The invention herein provides for the liquefying of cryogens, and hydrogen in particular, with efficiencies at least twice those of conventional liquefiers. Magnetic refrigeration carried out in accordance with the invention is based on the dependence of the entropy of certain materials on magnetic field and temperature, i.e., the magnetocaloric effect.

The invention utilizes the concept of active magnetic refrigeration in which a thermal wavefront is propagated back and forth through a regenerator during a magnetic cycle. The regenerator, composed of one or a plurality of layers of porous ferromagnetic materials, with Curie temperatures near the operating temperatures in the regenerator, should be capable of spanning large temperature differences. Several magnetic cycles such as Carnot, Brayton, or Stirling can be used. The preferred embodiment disclosed herein utilizes a Brayton cycle. The operation of such a refrigerator requires a fluid to couple the porous magnetic solid to the heat source and heat sink. Ser. No. 228,836 describes a reciprocating apparatus utilizing the concept of active magnetic regeneration.

Existing 60-W gas/cycle liquefiers, e.g., Claude cycle, operate at about 10% of Carnot efficiency. An apparatus in accordance with the present invention may operate in a range of about 60 to 90% Carnot for a 20-K to 300-K liquefier with about a 60-W cooling power operated at 20 K. A key reason for the substantial increase in efficiency from magnetic refrigerators in accordance with the invention is the elimination of room-temperature compressors and expanders which are typically present in conventional systems. Thus, a magnetic refrigeration system in accordance with the invention will not require components that produce large losses. Significantly, a magnetic refrigeration system in accordance with the invention will be less costly to construct and operate than a conventional system of the same capacity.

SUMMARY OF THE INVENTION

One object of the present invention is to lower the cost of producing a synthetic cryogenic fuel such as hydrogen.

Another object of the present invention is to increase efficiencies of refrigeration systems.

Another object of the invention is to eliminate room-temperature compressors from refrigeration systems.

In accordance with the present invention there is provided a magnetic regenerative wheel refrigerator comprising a substantially circular wheel having an axis of rotation and concentric inner and outer rims. A ferromagnetic or paramagnetic porous material is disposed within said wheel between the inner and outer rims. The material comprises at least one substance but may comprise several adjacent concentric layers having Curie temperatures near a cold temperature $T_C$ near the inner rim and a Curie temperature near a hot temperature $T_H$ near the outer rim. An approximately solenoidal-shaped magnet, such as a superconducting magnet, is disposed to produce a magnetic field essentially perpendicular to the axis of the wheel and parallel to its direction of rotation. A wheel rotating device, such as a drive shaft, is utilized to drive the wheel about its axis of rotation and through the magnetic field. Guiding devices such as support and guide wheels are utilized to maintain the wheel in its proper orientation. First and second inner fluid manifolds are disposed adjacent the inner rim of the wheel, and first and second outer fluid manifolds are disposed adjacent the outer rim of the wheel. Thermal load exchange and heat rejection exchange devices which communicate with the manifolds are provided. A pump moves a heat-conducting fluid from the heat rejection exchange through the first outer manifold, through a first portion of the material in the wheel adjacent to first outer manifold from the outer rim of the wheel to its inner rim. The fluid is then pumped through the first inner manifold to the thermal load exchange and from there through the second inner manifold through a second portion of the material in the wheel adjacent to the second inner manifold into and through the material and into the second outer manifold and back to heat rejection exchange.

One advantage of the instant invention is that it provides continuous refrigeration of a thermal load.

Another advantage of the instant invention is that operation of an apparatus in accordance therewith is highly efficient because there are no large sources of irreversible entropy.

Still another advantage of the instant invention is that easy staging is accomplished by adding an additional layer or layers to the inner diameter to span any temperature range between about 2 K and about 300 K.

Yet another advantage of the instant invention is that magnetic forces on the wheel thereof are automatically compensated by forces in the wheel going into the magnet partially cancelling those on the wheel coming out of the magnet.

Yet still another advantage of the instant invention is that an apparatus in accordance therewith may be operated at low speed providing a long lifetime.

Another advantage is that the invention can easily adapt to a distributed thermal load at a variety of temperatures so that a liquefier can be readily made.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated herein and form a part of the specification, illustrate an embodiment of the present invention and, together with the description, serve to explain the principles of the invention. In the drawings.

DETAILED DESCRIPTION OF A PREFERRED EMBODIMENT OF THE INVENTION

Figure 1:
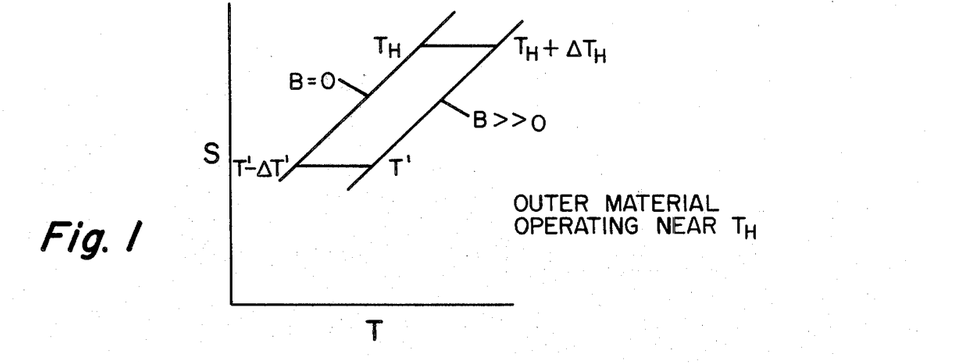
FIGS. 1, 2, and 3 are entropy-temperature diagrams for magnetic material at different diameters within the preferred embodiment of the invention.

An apparatus in accordance with the invention comprises in general a wheel composed of one or several layers of concentrically disposed ferromagnetic or paramagnetic porous material such that its Curie temperature, otherwise known as an ordering temperature, spans refrigeration temperatures desired, such as, for example, 2 K to 300 K. The innermost layer is selected to have an ordering temperature near a cold temperature $T_C$, and the outermost layer is selected to have an ordering temperature near a hot temperature $T_H$. Intermediate layers are selected to have ordering temperatures near the mean temperature at that diameter in the wheel, i.e., increasing ordering temperatures from the inside of the wheel toward the outside of the wheel. Each material executes a magnetic Brayton cycle with a minimum temperature excursion of twice $\Delta T$, the adiabatic temperature change as illustrated in FIG. 1.

Figure 2:
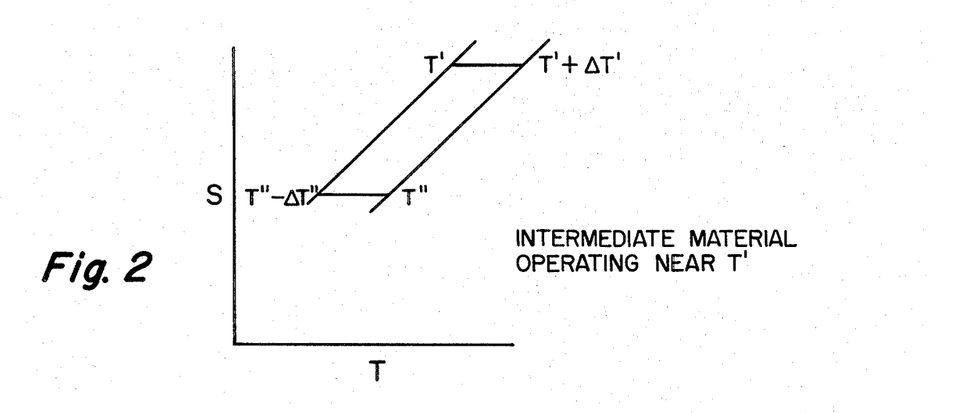
Figure 3:
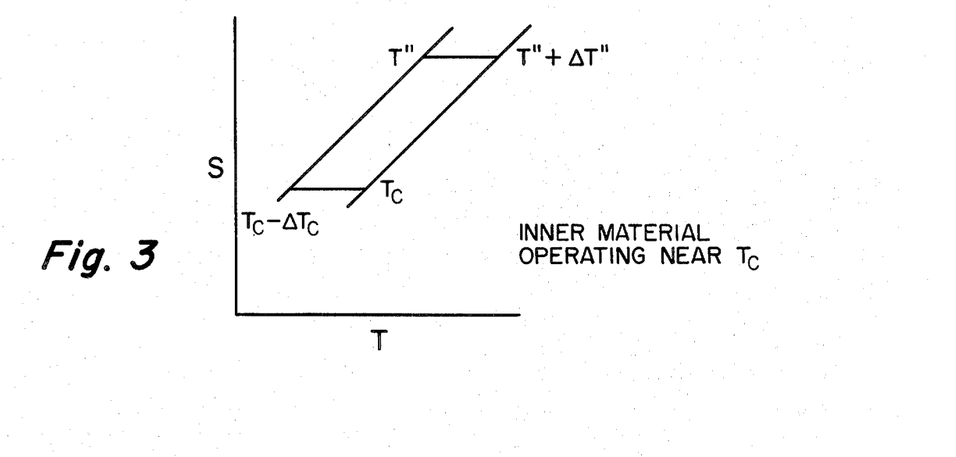
Figure 4:
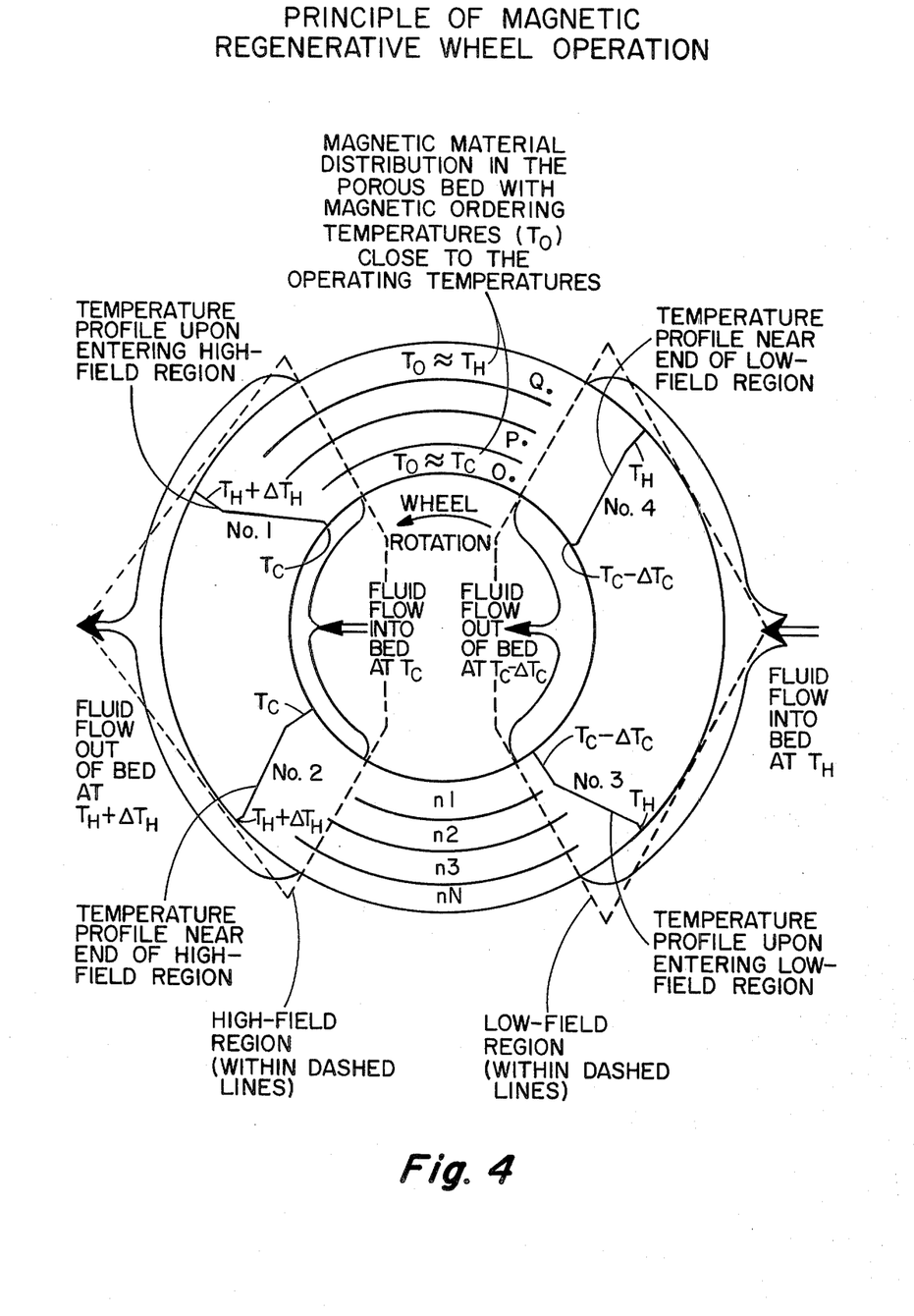
FIG. 4 illustrates the principle of magnetic regenerative wheel operation.
Figure 6:
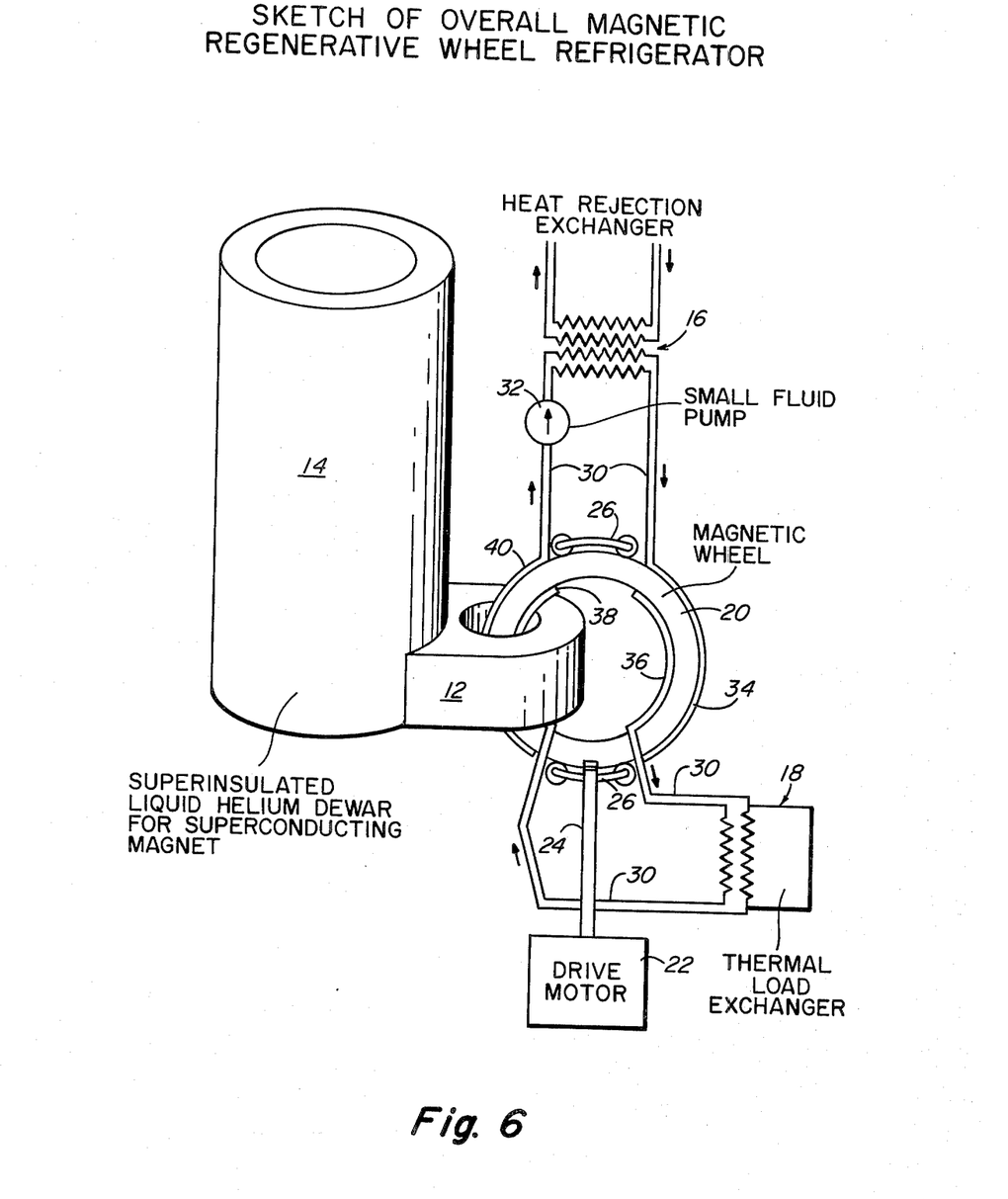
FIG. 6 schematically illustrates a preferred embodiment of the invention utilizing a regenerative wheel refrigerator.

The principle of operation of a regenerative magnetic wheel in accordance with the invention is as follows. Consider the schematic diagram in FIG. 2 showing the high-field region, low-field region, and temperature profiles at different locations in the wheel. Referring now to FIG. 4 as well as in FIG. 2, start with a pie-shaped section of material, enclosing points O, P, and Q at a temperature T. As the material at point P rotates into the high-field region, it adiabatically heats to $T + \Delta T'$ where $\Delta T'$ is the adiabatic magneto-caloric temperature change. The thermal mass of addenda, such as entrained fluid, can be made small compared to the thermal mass of magnetic material so nearly the full adiabatic temperature change is obtained. Material at points O and Q also increases in temperature by about $\Delta T'$ which results in temperature profile No. 1 seen in FIG. 4. As soon as the wheel enters the high-field region, fluid enters the inner diameter of this section at $T_C$ and exits the outer diameter at $T_H + \Delta T_H$. A thermal wavefront propagates radially outward as the wheel rotates through the high-field region resulting in temperature profile No. 2 seen in FIG. 4 near the end of that region. The fluid flow through the section ceases as the material leaves the high-field region, and the section of magnetic material adiabatically demagnetizes and cools by about $\Delta T''$ to yield temperature profile No. 3 seen in FIG. 4. As soon as the section of material enters the low-field region, fluid enters at the outer diameter at a temperature $T_H$. This fluid is the same as that which exited on the opposite outer diameter at $T_H + \Delta T_H$, but it has been cooled to $T_H$ in an external heat exchanger such as seen in FIG. 6 to be described hereinafter. The fluid exits the inner diameter in the low-field region at $T_C - \Delta T_C$. As this section rotates through the low-field region with fluid entering at $T_H$, a thermal wavefront propagates inwardly resulting in temperature profile No. 4 seen in FIG. 4 near the end of the low-field region. Fluid flow stops as the material returns to its original position ready to be adiabatically magnetized again. Cold fluid exiting at $T_C - \Delta T_C$ is put through a load heat exchanger also seen in FIG. 6 and is heated therein to $T_C$ before entering the inner diameter of the high-field region.

Figure 5:
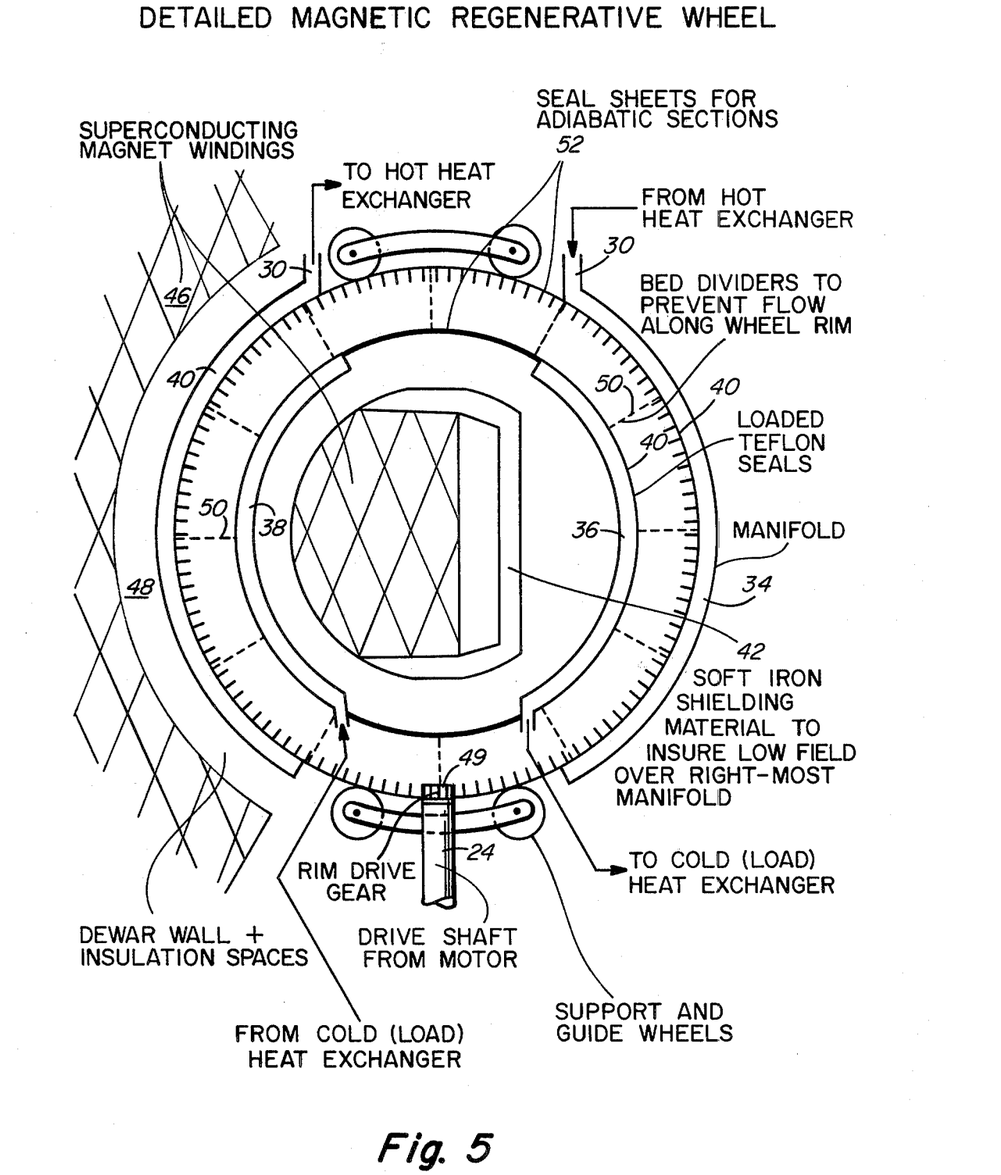
FIG. 5 schematically shows a magnetic regenerative wheel in accordance with the invention.

A schematic showing a system in accordance with the invention is illustrated in FIG. 6. As seen therein, a magnet which in the preferred embodiment is a superconducting magnet 12 is cooled by superinsulated liquid helium dewar 14. It will be appreciated by those skilled in the art that although a supercooled magnet is used in the preferred embodiment illustrated, other types of magnets may be used to practice the invention. The superconducting magnet 12 may be capable of producing high magnetic fields, such as about 5-6 tesla, but usually produces a magnetic field on the order of, for example, 4 to 9 tesla. A heat rejection exchanger 16 is provided along with a thermal load exchanger 18. The heat rejection exchanger 16 is operated at ambient temperature, and the thermal load exchanger 18 is operated at a cold temperature. A magnetic wheel 20 is driven by a drive motor 22 and drive shaft 24. Wheel 20 is supported by support and guide wheel structures 26. It will be appreciated by those skilled in the art that although a simple rim drive gear as shown in FIG. 5 is utilized in the preferred embodiment, a magnetic drive or other drive may be used to rotate the wheel. Similarly, although support and guide wheels are used to position and maintain the position of the wheel in the preferred embodiment, other devices capable of maintaining the wheel in position will be apparent to those of ordinary skill in the art. Magnetic wheel 20 contains the porous material previously mentioned. A fluid such as helium or hydrogen gas is pumped through a conduit 30 by a pump 32, through the heat exchanger 16, through the conduit 30 into a first outer manifold 34, through the porous material in the wheel, through first inner manifold 36, through conduit 30 to thermal load exchanger 18, from there back through conduit 30 into a second inner manifold 38, through the porous material in the wheel into a second outer manifold 40, and back through conduit 30 into pump 32. The arrows show the direction of fluid flow.

A schematic cross-sectional view of the wheel is seen in FIG. 5. It shows where loaded Teflon seals 40 can be disposed between the manifolds and the wheel. Soft iron shielding material 42 is provided to ensure low-field over the wheel section between the right-most manifolds. A rim drive gear 49 is disposed on drive shaft 24. Also shown are superconducting magnet windings 46, dewar wall and insulation space 48, and bed dividers 50, which prevent flow of the fluid along the direction of the wheel rim, thereby maintaining the fluid's inward or outward flow. In the preferred embodiment, adiabatic seal sheets 52 are provided for adiabatic sections of the wheel so that seal leakage from the manifold does not leave the system. FIG. 4 illustrates how the ferromagnetic or magnetic material may be deposited in concentric layers such as n1, n2, and n3 out to a final layer nN.

Materials that can be used as the ferromagnetic or paramagnetic materials in the wheel comprise at least the following:

TABLE I

| Compound | Curie Temperature | Compound | Curie Temperature |
|---|---|---|---|
| Gd | 293 K | MnAs | 318 K |
| $Gd_3Al_2$ | 287 K | MnP | 298 K |
| $Gd_5Si_4$ | 336 K | CrTe | 333 K |
| $Gd_6Mn_{23}$ | 480 K | $GdFe_2$ | 795 K |
| $Gd_2Fe_{17}$ | 490 K | $GdRu_2$ | 83 K |
| $GdOs_2$ | 65 K | GdMg | 120 K |
| $GdMg_2$ | 81 K | GdZn | 268 K |
| GdCd | ~250 K | $GdAl_2$ | ~165 K |
| GdGa | 190 K | $Gd_3In$ | ~213 K |
| $Gd_4Co_3$ | ~220 K | $GdCo_3$ | ~610 K |
| $GdCo_5$ | ~1000 K | $Gd_2Co_{17}$ | ~1200 K |
| GdRh | 25 K | $GdRh_2$ | 74 K |
| $GdIr_2$ | 89 K | GdNi | ~70 K |
| $GdNi_2$ | ~72 K | $GdNi_3$ | ~118 K |
| $Gd_2Ni_7$ | ~120 K | $GdNi_5$ | ~30 K |
| $Gd_2Ni_{17}$ | ~200 K | $Gd_5Pd_2$ | 335 K |
| GdPd | ~40 K | $GdPt_2$ | ~50 K |

There will also be many ternary compounds that will allow the Curie temperature to be adjusted according to the stoichiometry, e.g.:

TABLE II

| GdNiAl | $T_C$ = 61–70 K, variable with Ni or Al |
| GdCuAl | $T_C$ = 67–90 K |
| GdNiIn | $T_C$ = 83 |
| GdPdIn | $T_C$ = 102 |
| $Gd_5Si_{4-x}Ge_x$ | $T_C$ = 300–336 K |

Paramagnetic material of interest may be the following:

TABLE III

| Lattice System | Compound |
|---|---|
| Triclinic | $Gd(NO_3)_3 \cdot 6H_2O$ |
| Monoclinic | $GdPO_4$ |
| | GdOOH |
| | $Gd_2(WO_4)_3$ |
| | $GdCl_3 \cdot 6H_2O$ |
| | $Gd_2(SO_4)_3 \cdot 8H_2O$ |
| | $Gd_2(SO_4)_3$ |
| | $Gd_2(C_2O_4) \cdot 10H_2O$ |
| | $GdP_5O_{14}$ |
| | $GdBr_3 \cdot 6H_2O$ |
| | B-form $Gd_2O_3$ |
| Orthorhombic | $GdAlO_3$ |
| | $GdFeO_3$ |
| | $GdCrO_3$ |
| | $GdScO_3$ |
| | $GdVO_3$ |
| | $GdTiO_3$ |
| | $GdMnO_3$ |
| | $GdCoO_3$ |
| | $GdGaO_3$ |
| | $GdRhO_3$ |
| | $GdInO_3$ |
| | $Gd_2TiO_5$ |
| | $\beta$-$Gd_2(MoO_4)_3$ |
| | $Gd_2O_2SO_4$ |
| Tetragonal | $GdNbO_4$ |
| | $GdVO_4$ |
| | $GdAsO_4$ |
| | $Gd_2GeMoO_8$ |
| | $Gd_2GeWO_8$ |
| | GdOF |
| | GdOCl |
| | GdOBr |
| | GdOI |
| Hexagonal | $Gd_2O_2S$ |
| | $Gd(OH)_3$ |

TABLE III-continued

| Lattice System | Compound |
|---|---|
| | $GdCl_3$ |
| | $GdBr_3$ |
| | $GdI_3$ |
| | $GdF_3$ |
| | A-form $Gd_2O_3$ |
| | $GdH_3$ |
| | $Gd_3NbO_7$ |
| | $GdB_6$ |
| | $Gd(C_2H_5SO_4) \cdot 9H_2O$ |
| | $Gd_2Mg_3(NO_3)_{12} \cdot 24H_2O$ |
| | $GdH_{2.01}$ |
| Cubic | $Gd_3(Al_9Fe,Ga)_5O_{12}$ |
| | $Gd_4(P_2O_7)_3$ |
| | C-form $Gd_2O_3$ |
| | $Gd_3NF_6$ |
| | $Gd_{0.1}WO_3$ |
| | $Gd_2Sn_2O_7$ |
| | $Gd_2Ti_2O_7$ |
| | $Gd_2GaSbO_7$ |
| | $Gd_2CrSbO_7$ |
| | $Gd_2Ru_2O_7$ |
| | $Gd_2Ir_2O_7$ |
| Other | $Gd_2SrO_4$ |
| (amorphous, | $Gd_2S_3$ |
| mixed, etc.) | $Gd_3S_4$ |
| | $GdMo_6S_8$ |
| | $Gd_{2.01}Se_{2.99}$ |
| | $Gd(PO_3)_3$ |
| | $Gd_2(CO_3)_3$ |
| | $Gd(HCCO)_3$ |
| | $GdBO_3$ |

It will be appreciated by those skilled in the art that any particular ferromagnetic material can only span about 40–50 K and any particular paramagnetic material can only be used below about 25 K. If larger temperature ranges are required, several materials must be staged.

The magnet illustrated is approximately solenoidal-shaped. A magnet of such shape is preferable because it produces a magnetic field perpendicular to the axis of the wheel and parallel to the direction of rotation of the wheel. This field orientation is very important and significant because it allows a low-field region to be readily achieved by a minimum of soft-iron shielding. In the preferred embodiment, the field in the high-field region may be about 6 T with a field of less than 0.5 T in the low-field region.

Although a rim drive is shown for schematic illustration, a magnetic drive may be utilized on the wheel. The drive is preferably disposed on the wheel near the outer rim, which is always near the hot temperature, usually about room temperature. Support and guide rollers which maintain the wheel in the correct orientation are also disposed near the hot-temperature outer rim region of the wheel.

Each manifold remains near a fixed temperature and may be designed for, for example, 1 MPa of helium gas. The manifolds are connected together on the inner and outer diameters of the wheel by sheets of low thermal mass material to keep fluid from leaking along the porous wheel and out into the environment. The seals in the manifold edges can be made from a loaded Teflon material for long wear. Other suitable materials will be apparent to those skilled in the art. The seals are circumferential and need not be perfect since the inner and outer manifolds can be connected, if necessary, by a low thermal conductivity, low thermal mass sheet such as fiberglass or Mylar to completely hermetically seal the heat exchange fluid system. The porous magnetic material may be made from individual particles, a solid material with radially drilled holes, a mesh, or the like. In the preferred embodiment, spherical particles on the order of 0.1-1 mm in diameter may be used. Screens are disposed on the inner and outer diameters of each particulate layer to retain the particles and yet provide essentially no additional pressure drop. The preferred embodiment of the wheel utilizes dividers 50 best seen in FIG. 5 to stop fluid flow along the wheel rim from the high-field manifolds to the low-field manifolds. The material can also be thin, closely spaced sheets of magnetic material orientated radially instead of porous solid or particulate material.

Although the preferred embodiment has a most economical use of winding volume and has its B field perpendicular to the axis of the wheel and parallel to the rotational direction of the wheel, one may desire to put Helmholtz-type coils on either side of the wheel in a high-field region to produce a B field parallel to the axis and perpendicular to the direction of rotation. Another alternative structure is to use a racetrack-type coil over the high-field region of the wheel to produce a B field perpendicular to the axis and perpendicular to its rotational direction. Those skilled in the art will appreciate that a variety of exotic coil shapes such as Ying-Yang-type coils can be utilized. The structure of the preferred embodiment was utilized because it produces a very low-field region near the high-field region. Shielding and possibly compensating coils can be utilized to ensure a good low-field region.

Figure 7:
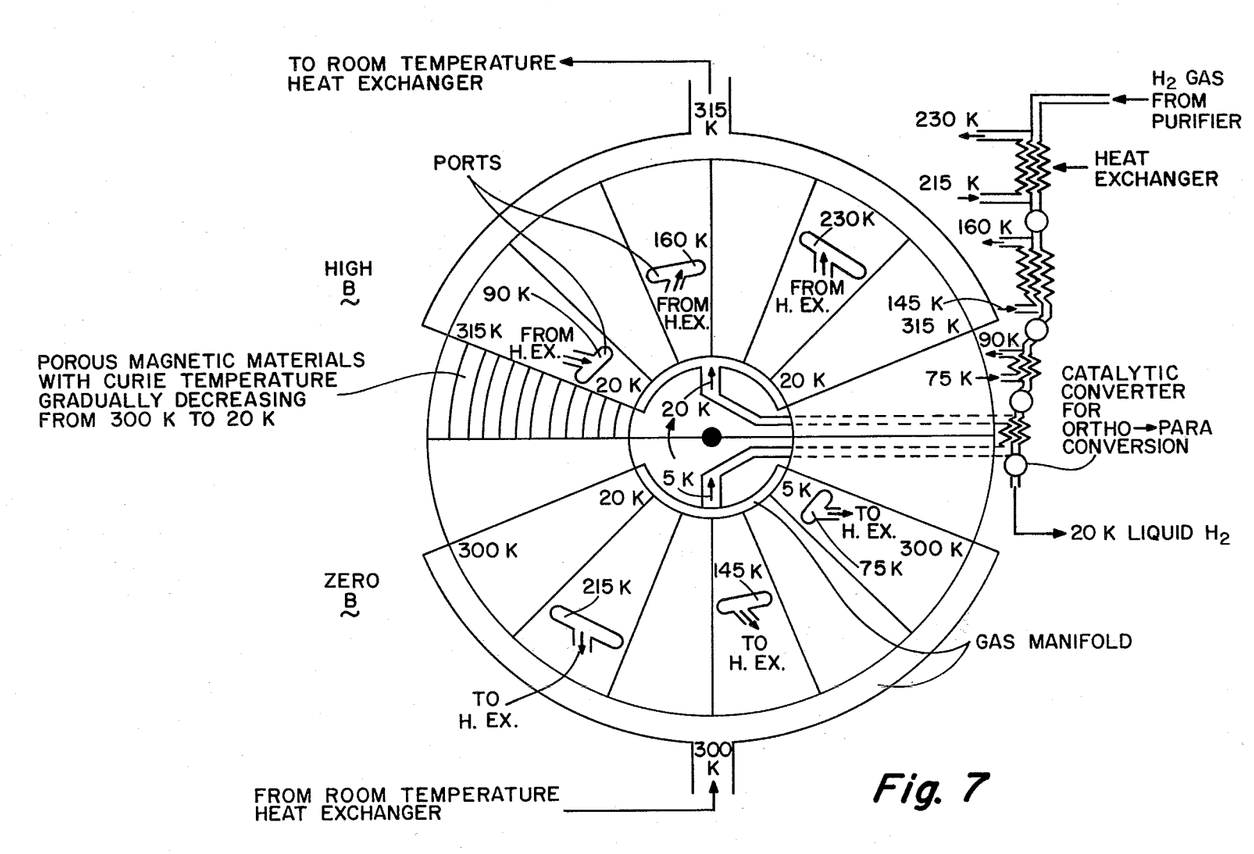
FIG. 7 schematically illustrates operation of a magnetic regenerative wheel in accordance with the invention to liquefy hydrogen.

In accordance with the invention, the magnetic refrigerator thereof can be easily used as a magnetic liquefier because of the capability of distributed cooling at any desired temperature. This is in sharp contrast to a gas-cycle liquefier where refrigeration is only provided at discrete temperatures when expansion of the gas occurs. The regenerative wheel may be used as a hydrogen liquefier as illustrated in FIG. 7. This particular design provides significant increases in efficiency for hydrogen liquefaction, thereby substantially reducing the cost of producing liquid hydrogen. Analysis of the cost of liquid hydrogen shows that about half of the cost is from the feed supply and the other half from the liquefaction process. Present methods of liquefaction of hydrogen and other cryogens are based on gas refrigeration methods which are generally inefficient with maximum efficiencies of about 35% of ideal. Magnetic refrigerators eliminate the major sources of inefficiency and so should be able to operate at efficiencies about double those of gas refrigerators, thereby significantly reducing liquefaction costs.

The magnetic material has to have excellent heat transfer capability which generally means a large surface area configuration such as closely packed thin sheets, a porous bed of particles such as chips or spheres, or a block with many radial channels through it. One of the simplest modes to fabricate is a packed, porous bed of particles. The design choice of bed size and shape for a given refrigeration power depends upon the balance between maximum heat transfer for minimum pressure-drop loss and longitudinal conduction loss including diffusive mixing. The choice of fluid for heat transfer depends upon temperature span and application. Generally, large temperature spans require a gas such as helium or hydrogen; but liquids may also be considered if several interstage heat exchangers are used.

The foregoing description of a preferred embodiment of the invention has been presented for purposes of illustration and description. It is not intended to be exhaustive or to limit the invention to the precise form disclosed; and, obviously, many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A magnetic regenerative wheel refrigerator comprising:
   a substantially circular wheel comprising an axis of rotation and concentric inner and outer rims;
   ferromagnetic or paramagnetic porous material disposed within said wheel between said inner and outer rims, said material comprising at least one substance, said material having a Curie temperature near a cold temperature $T_C$ near said inner rim and a Curie temperature near a hot temperature $T_H$ near said outer rim;
   an approximately solenoidal-shaped magnet disposed to produce a magnetic field essentially perpendicular to said axis of said wheel and parallel to its direction of rotation;
   means for driving said wheel about its axis of rotation and through said magnetic field;
   means for maintaining said wheel in proper orientation;
   first and second inner fluid manifolds adjacent said inner rim of said wheel;
   first and second outer fluid manifolds adjacent said outer rim of said wheel;
   thermal load exchange means;
   heat rejection exchange means; and
   means for pumping and conducting a fluid from said heat rejection exchange means through said first outer manifold, through a first portion of said material in said wheel adjacent said first outer manifold, from outer rim to inner rim, into and through said first inner manifold to said thermal load exchange means, from there through said second inner manifold, through a second portion of said material in said wheel adjacent said second inner manifold into and through said second manifold and back to said heat rejection means.

2. The invention of claim 1 wherein said magnet comprises a superconducting magnet and means for cooling it.

3. The invention of claim 2 wherein said fluid comprises hydrogen.

4. The invention of claim 1 wherein said wheel driving means comprises a motor, a drive shaft, and a rim drive gear.

5. The invention of claim 4 wherein said driving means drives the outside rim of said wheel.

6. The invention of claim 1 wherein said wheel driving means comprises a magnetic drive.

7. The invention of claim 6 wherein said driving means drives the outside rim of said wheel.

8. The invention of claim 1 wherein said driving means comprises a friction drive.

9. The invention of claim 8 wherein said driving means drives the outside rim of said wheel.

10. The invention of claim 1 wherein said ferromagnetic or paramagnetic material comprises a plurality of concentric layers, said inner layer having a Curie temperature near $T_C$ and said outer layer having a Curie temperature near $T_H$, any intersticed layers having increasing Curie temperatures from inner to outer placement in accordance with their location.

11. The invention of claim 1 wherein said wheel maintaining means comprises support rollers.

12. The invention of claim 1 further comprising means for sealing said wheel between said manifolds to prevent fluid leakage.

13. The invention of claim 1 further comprising means for sealing said manifolds against said inner and outer rims to prevent fluid leakage.

14. The invention of claim 1 wherein said material comprises particles.

15. The invention of claim 1 wherein said material comprises spherical particles.

16. The invention of claim 1 wherein said material comprises porous solid material.

17. The invention of claim 1 wherein said material comprises a solid material having channels extending substantially radially therethrough.

18. The invention of claim 1 wherein said material comprises thin sheets of radially extending material spaced relative to one another.

19. The invention of claim 1 wherein bed dividers are disposed substantially radially in said wheel between said inner and outer rims.

* * * * *